(12) United States Patent
Zeng et al.

(10) Patent No.: US 12,238,330 B2
(45) Date of Patent: Feb. 25, 2025

(54) RADIO FREQUENCY ASSEMBLY AND ELECTRONIC DEVICE

(71) Applicant: ZHEJIANG DAHUA TECHNOLOGY CO., LTD., Hangzhou (CN)

(72) Inventors: Feiyang Zeng, Hangzhou (CN); Dong Jiang, Hangzhou (CN); Jucai Lin, Hangzhou (CN); Jun Yin, Hangzhou (CN); Cheng Fang, Hangzhou (CN)

(73) Assignee: SHEJIANG DAHUA TECHNOLOGY CO., LTD., Hangzhou (CN)

( * ) Notice: Subject to any disclaimer, the term of this patent is extended or adjusted under 35 U.S.C. 154(b) by 155 days.

(21) Appl. No.: 17/722,393

(22) Filed: Apr. 18, 2022

(65) Prior Publication Data

US 2022/0248048 A1 Aug. 4, 2022

Related U.S. Application Data

(63) Continuation of application No. PCT/CN2020/138397, filed on Dec. 22, 2020.

(30) Foreign Application Priority Data

Dec. 27, 2019 (CN) .......................... 201911383004.1

(51) Int. Cl.
*H04N 19/56* (2014.01)
*H04N 19/11* (2014.01)
(Continued)

(52) U.S. Cl.
CPC ............. *H04N 19/56* (2014.11); *H04N 19/11* (2014.11); *H04N 19/139* (2014.11);
(Continued)

(58) Field of Classification Search
CPC ...... H04N 19/56; H04N 19/11; H04N 19/139; H04N 19/159; H04N 19/176;
(Continued)

(56) References Cited

U.S. PATENT DOCUMENTS 10,462,462 B2  10/2019  Chien et al.
11,606,566 B2 * 3/2023  Lee ...................... H04N 19/176
(Continued)

FOREIGN PATENT DOCUMENTS

CN   103561263 A   2/2014
CN   106797476 A   5/2017
(Continued)

OTHER PUBLICATIONS

International search report and Written Opinion of the International Search Authority, International Application No. PCT/CN2020/138397, mailed Mar. 17, 2021 (9 pages).
(Continued)

*Primary Examiner* — Tung T Vo

(57) ABSTRACT

The present disclosure relates to a motion vector prediction method, a video coding method, and related apparatuses and devices. The motion vector prediction method includes: acquiring a candidate list of a current coding block in a preset prediction mode, where the candidate list includes a plurality of candidate motion vectors; performing a motion search of the plurality of candidate motion vectors in the candidate list to obtain an initial optimal motion vector of the current coding block in the preset prediction mode; performing motion compensation on the initial optimal motion vector by using each of a first preset number of pixel accuracies, to determine a final optimal motion vector of the current coding block, where the preset prediction mode
(Continued)

comprises any one of a plurality of prediction modes, and pixel accuracies used in any one of the prediction modes are identical.

11 Claims, 6 Drawing Sheets

(51) Int. Cl.

| | |
|---|---|
| *H04N 19/139* | (2014.01) |
| *H04N 19/159* | (2014.01) |
| *H04N 19/176* | (2014.01) |
| *H04N 19/182* | (2014.01) |
| *H04N 19/184* | (2014.01) |
| *H04N 19/186* | (2014.01) |
| *H04N 19/52* | (2014.01) |
| *H04N 19/567* | (2014.01) |
| *H04N 19/593* | (2014.01) |
| *H04N 19/70* | (2014.01) |
| *H04N 19/80* | (2014.01) |

(52) U.S. Cl.
CPC ......... *H04N 19/159* (2014.11); *H04N 19/176* (2014.11); *H04N 19/182* (2014.11); *H04N 19/184* (2014.11); *H04N 19/186* (2014.11); *H04N 19/52* (2014.11); *H04N 19/567* (2014.11); *H04N 19/593* (2014.11); *H04N 19/70* (2014.11); *H04N 19/80* (2014.11)

(58) Field of Classification Search
CPC .. H04N 19/182; H04N 19/184; H04N 19/186; H04N 19/52; H04N 19/567; H04N 19/593; H04N 19/70; H04N 19/80; H04N 19/105; H04N 19/523; H04N 19/513
USPC ..................................................... 375/240.16
See application file for complete search history.

(56) References Cited

U.S. PATENT DOCUMENTS

| | | | | |
|---|---|---|---|---|
| 11,722,688 B2* | 8/2023 | Liu | ...................... | H04N 19/513 |
| | | | | 375/240.16 |
| 11,812,050 B2* | 11/2023 | Chen | .................... | H04N 19/189 |
| 2008/0165856 A1* | 7/2008 | Suzuki | .................. | H04N 19/52 |
| | | | | 375/E7.125 |
| 2011/0038419 A1* | 2/2011 | Han | ...................... | H04N 19/176 |
| | | | | 375/E7.104 |
| 2012/0207220 A1 | 8/2012 | Kim et al. | | |
| 2014/0044170 A1* | 2/2014 | Sato | ...................... | H04N 19/523 |
| | | | | 375/240.12 |
| 2016/0337662 A1* | 11/2016 | Pang | ..................... | H04N 19/523 |
| 2019/0246134 A1 | 8/2019 | Abe et al. | | |
| 2020/0099952 A1* | 3/2020 | Kanoh | ................. | H04N 19/543 |
| 2020/0195956 A1* | 6/2020 | Robert | ................... | H04N 19/52 |
| 2021/0195227 A1* | 6/2021 | Lee | ......................... | H04N 19/55 |
| 2021/0274167 A1* | 9/2021 | Liu | ...................... | H04N 19/126 |
| 2021/0321112 A1* | 10/2021 | Liang | .................. | H04N 19/567 |
| 2021/0329293 A1* | 10/2021 | Xu | ...................... | H04N 19/139 |
| 2021/0400298 A1* | 12/2021 | Zhao | ................... | H04N 19/513 |
| 2022/0038682 A1* | 2/2022 | Lim | ..................... | H04N 19/105 |
| 2022/0086441 A1* | 3/2022 | Zhang | ................. | H04N 19/176 |

FOREIGN PATENT DOCUMENTS

| | | |
|---|---|---|
| CN | 108259912 A | 7/2018 |
| CN | 109218733 A | 1/2019 |
| CN | 109660799 A | 4/2019 |
| CN | 109792531 A | 5/2019 |
| CN | 110166778 A | 8/2019 |
| CN | 110581998 A | 12/2019 |
| CN | 111050182 A | 4/2020 |
| EP | 2146510 A1 | 1/2010 |
| WO | WO2017156669 A1 | 9/2017 |
| WO | WO2017156705 A1 | 9/2017 |
| WO | WO2018065397 A2 | 4/2018 |

OTHER PUBLICATIONS

Chinese First Office Action, Chinese Application No. 201911383004.1, mailed Aug. 9, 2021 (16 pages).
Notification to Grant Patent Right for Invention, Chinese Application No. 201911383004.1, mailed Jan. 17, 2022 (6 pages).
Non-CE4: Unified context model of AMVR and Affine AMVR.
Jainle Chen et al: "Algorithm description for Versatile Video Coding and Test Model 7 (VTM 7)", 16. JVET Meeting; Oct. 1-Oct. 11, 2019; Geneva; (The Joint Video Exploration Team of ISO/IEC JTC1/SC29/ WG11 and TU-T SG. 16), No. JVET-P2002-v1; JVET-P2002 ; m51516 Nov. 10, 2019, pp. 1-90.
European search report, Application No. 20907180.2 , mailed Dec. 22, 2022(10 pages).
European Examination Report, European Application No. 20907180.2, mailed Aug. 1, 2024(6 pages).

* cited by examiner

RADIO FREQUENCY ASSEMBLY AND ELECTRONIC DEVICE

CROSS-REFERENCE TO RELATED APPLICATIONS

The present application is a continuation-application of International (PCT) Patent Application No. PCT/CN2020/138397 filed on Dec. 22, 2020, which claims foreign priority of Chinese Patent Application No. 201911383004.1, filed on Dec. 27, 2019 in China National Intellectual Property Administration, the entire contents of which are hereby incorporated by reference.

FIELD

The present disclosure relates to the field of video coding and decoding, and particularly to a motion vector prediction method, a video coding method, and related apparatuses and devices.

BACKGROUND

Due to a quite great quantity of video image data, it is usually needed to code and compress video pixel data (such as RGB, YUV, etc.) to reduce the video data quantity. The compressed data is referred to as a video code stream, which is transmitted to a user terminal via a wired or wireless network, before being decoded and viewed.

Video coding mainly includes several parts including acquisition, prediction, transformation and quantization, and entropy coding. Therein, the prediction part is divided into three portions, namely, intra prediction, inter prediction, and intra block copy prediction. Various prediction modes differ from each other, thereby posing difficulty for software and hardware implementation of the prediction. For example, an Advanced Motion Vector Prediction (AMVP) mode, as one of the main prediction modes, has evolved into multiple branches in the process of technological development, such as a conventional AMVP mode, an affine AMVP mode, and an AMVP mode based on intra block copy, a Hash AMVP mode, etc. Further, in the process of selecting and using any of the multiple modes included in the above AMVP mode, especially when more than one mode is selected, a need exists for construction of a separate processing loop for each mode due to discrepancies between the respective modes, which is thus not conducive to the software and hardware implementation and increases the implementation difficulty. In view of the above, it has become an urgent problem to be solved as to how to reduce the software and hardware implementation difficulty of motion vector prediction.

SUMMARY

The present disclosure provides a motion vector prediction method, a video coding method, and related apparatuses and devices, which can reduce the software and hardware implementation difficulty of motion vector prediction.

In order to solve the above technical problem, a first aspect of the present disclosure provides a motion vector prediction method, comprising: acquiring a candidate list of a current coding block in a preset prediction mode, where the candidate list comprises a plurality of candidate motion vectors; performing a motion search of the plurality of candidate motion vectors in the candidate list to obtain an initial optimal motion vector of the current coding block in the preset prediction mode; performing motion compensation on the initial optimal motion vector by using each of a first preset number of pixel accuracies to determine a final optimal motion vector of the current coding block. Therein, the preset prediction mode comprises any one of a plurality of prediction modes, and pixel accuracies used in any one of the prediction modes are identical.

In order to solve the above problem, a second aspect of the present disclosure provides a video coding method, comprising: constructing a candidate list of a current coding block in a preset prediction mode, where the candidate list contains a plurality of candidate motion vectors; acquiring a final optimal motion vector of the current coding block based on the candidate list, where the final optimal motion vector is obtained by using a prediction method according to the first aspect described above; selecting one of the plurality of candidate motion vectors as a predictive motion vector, and coding the current coding block based on the predictive motion vector and the final optimal motion vector.

In order to solve the above problem, a third aspect of the present disclosure provides a storage device, having stored thereon program instructions which can be executed by a processor to implement a prediction method according to the first aspect described above or to implement a video coding method according to the second aspect described above.

According to the above solutions, a candidate list of a current coding block in a preset prediction mode is acquired, where candidate list comprises a plurality of candidate motion vectors. Then, a motion search of the plurality of candidate motion vectors in the candidate list is performed to obtain an initial optimal motion vector of the current coding block in the preset prediction mode. Further, a first preset number of pixel accuracies are each used to perform motion compensation on the initial optimal motion vector to determine a final optimal motion vector of the current coding block. The preset prediction mode includes any one of a plurality of prediction modes, and pixel accuracies used in any one of the prediction modes are identical. Thereby, it is possible to make the pixel accuracies used in the plurality of prediction modes consistent and processing loops used in the plurality of prediction modes consistent to reduce the software and hardware implementation difficulty of motion vector prediction, which is conductive to improving the prediction accuracy.

DETAILED DESCRIPTION

Figure 1:
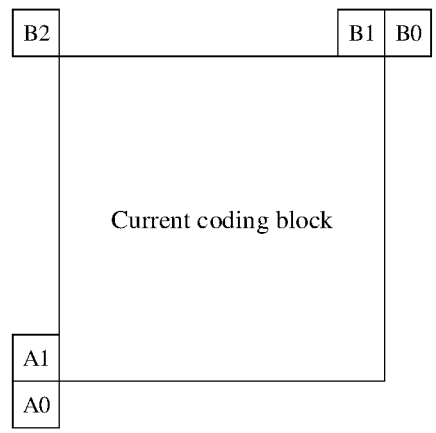
FIG. 1 is a schematic diagram of a position relationship between a current coding block and a spatial-domain block according to motion vector prediction method embodiments of the present disclosure.

The technical solutions in embodiments of the present disclosure will be clearly and completely described below in conjunction with the drawings in the embodiments of the present disclosure. Obviously, the described embodiments are only a part of the embodiments of the present disclosure, rather than all the embodiments. All other embodiments obtained by those of ordinary skill in the art based on the embodiments of the present disclosure without creative work fall within the protection scope of the present disclosure.

The terms "first", "second", and "third" in the present disclosure are used only for descriptive purposes, and shall not be construed as indicating or implying relative importance or implicitly indicating the number of technical features indicated. Therefore, the features defined with "first", "second", and "third" may explicitly or implicitly include at least one of the features. In the description of the present disclosure, "a plurality or means at least two, such as two, three, etc., unless specifically defined otherwise. All the directional indicators (such as upper, lower, left, right, front/forward, back/backward/after, and the like) in the embodiments of" the present disclosure are only used to explain a relative position relationship between the respective components in a certain specific posture (as shown in the drawings), motion circumstances, and the like. If the specific posture varies, the directional indicator will vary accordingly. In addition, the terms "comprise/include" and "have" and any variants thereof are intended to cover non-exclusive inclusion. For example, a process, method, system, product, or apparatus that includes a series of steps or units is not limited to the listed steps or units, but optionally further includes unlisted steps or units, or optionally further includes other steps or units inherent to the process, method, product or apparatus.

Reference to "embodiment" herein means that specific features, structures, or properties described in conjunction with the embodiment may be included in at least one embodiment of the present disclosure. Appearance of the phrase in various locations of the description neither necessarily refers to a same embodiment, nor refers to an independent or alternative embodiment mutually exclusive with other embodiments. Those skilled in the art explicitly and implicitly understand that the embodiment described in the present disclosure can be combined with other embodiments. It should be noted that, for the following method embodiments, if there are substantially the same results, the method of the present disclosure is not limited to the process sequence illustrated.

In a first aspect of the present disclosure, a motion vector prediction method is provided. The method comprises: acquiring a candidate list of a current coding block in a preset prediction mode, wherein the candidate list comprises a plurality of candidate motion vectors; performing a motion search of the plurality of candidate motion vectors in the candidate list to obtain an initial optimal motion vector of the current coding block in the preset prediction mode; performing motion compensation on the initial optimal motion vector by using each of a first preset number of pixel accuracies, to determine a final optimal motion vector of the current coding block; wherein the preset prediction mode comprises any one of a plurality of prediction modes, and pixel accuracies used in any one of the prediction modes are identical.

In some embodiments, said performing motion compensation on the initial optimal motion vector by using each of a first preset number of pixel accuracies, to determine a final optimal motion vector of the current coding block comprises: performing refinement treatment on the initial optimal motion vector by using each of the first preset number of pixel accuracies to obtain a plurality of first offset motion vectors deviating from the initial optimal motion vector; using each of the first preset number of pixel accuracies as a first target pixel accuracy; selecting any one of the initial optimal motion vector and the first offset motion vectors whose pixel accuracies are lower than the first target pixel accuracy, as a starting motion vector corresponding to the first target pixel accuracy; performing refinement treatment on the starting motion vector corresponding to the first target pixel accuracy by using the first target pixel accuracy to obtain a plurality of second offset motion vectors deviating from the starting motion vector; selecting, from the plurality of second offset motion vectors, a motion vector whose rate-distortion cost satisfies a preset screening condition, as the final optimal motion vector of the current coding block.

In some embodiments, the first preset number is an integer and not less than 3; and/or, the pixel accuracies comprise: a 1/16 pixel accuracy, a 1/8 pixel accuracy, a 1/4 pixel accuracy, a 1/2 pixel accuracy, an integer pixel accuracy, a 2 times pixel accuracy, a 4 times pixel accuracy, a 8 times pixel accuracy, and a 16 times pixel accuracy; and/or, in any one of the preset prediction modes, a same one of the pixel accuracies corresponds to a same pixel accuracy identifier used to represent the pixel accuracy; wherein the plurality of preset prediction modes comprise: a conventional AMVP mode, an affine AMVP mode, an AMVP mode based on intra block copy, and a Hash AMVP mode.

In some embodiments, the performing a motion search of the plurality of candidate motion vectors in the candidate list to obtain an initial optimal motion vector of the current coding block in the preset prediction mode comprises: in response to the conventional AMVP mode, performing motion compensation on the candidate motion vectors in the candidate list and calculating Rate Distortion costs (RD-COSTs) based on Sum of Absolute Difference (SAD) thereof; selecting the candidate motion vector with the smallest RDCOST as a starting motion vector of a TZ search; performing a TZ search with the starting motion vector to acquire the initial optimal motion vector.

In some embodiments, the performing motion compensation on the initial optimal motion vector by using each of a first preset number of pixel accuracies, to determine a final optimal motion vector of the current coding block comprises: taking the initial optimal motion vector as a starting motion vector, and using each of the first preset number of pixel accuracies to offset the starting motion vector; selecting the motion vector with the smallest RDCOST from the plurality of offset motion vectors, as a final optimal motion vector.

In some embodiments, the performing a motion search of the plurality of candidate motion vectors in the candidate list to obtain an initial optimal motion vector of the current coding block in the preset prediction mode comprises: in response to the affine AMVP mode, according to a position relationship between the center point and the CP point of each 4*4 sub-block, using a Control Point's MV (CPMV) affine method to obtain the MVs of each sub-block; after each sub-block acquires the MVs, acquiring a prediction of each sub-block through a motion compensation difference filter, and combining the predictions of all the sub-blocks to derive a pixel value of the entire match block; making differences between the pixel values of the match blocks and the original pixel value of the current coding block to obtain Rate Distortion costs (RDCOSTs) based on Sum of Absolute Transformed Difference (SATD); selecting the CPMV with the smallest RDCOST as Control Point's Motion Vector Prediction (CPMVP), using the CPMVP to iteratively update CPMV based on optical flow and thereby acquire the initial optimal motion vector.

In some embodiments, the performing motion compensation on the initial optimal motion vector by using each of a first preset number of pixel accuracies, to determine a final optimal motion vector of the current coding block comprises: subjecting the CPMV subjected to preset offset vectors, and selecting the motion vector with the smallest RDCOST as the final optimal motion vector.

In some embodiments, the motion vector prediction method further comprises: in response to the AMVP mode based on intra block copy, using a method of Hash matching to acquire the initial optimal motion vector.

In some embodiments, the motion vector prediction method further comprises: if the Hash matching fails to find the initial optimal motion vector, using the method of motion search to acquire the initial optimal motion vector.

In some embodiments, the motion vector prediction method further comprises: in response to the Hash AMVP mode, using a method of Hash matching to acquire the initial optimal motion vector.

In some embodiments, the motion vector prediction method further comprises: acquiring a candidate list of the current coding block in each of at least two modes of the conventional AMVP mode, the affine AMVP mode, the AMVP mode based on intra block copy, and the Hash AMVP mode; acquiring the final optimal motion vectors and the corresponding Rate Distortion costs (RDCOSTs) in the at least two modes; selecting the final optimal motion vector with the smallest RDCOST as the final optimal motion vector of the current coding block.

In a second aspect of the present disclosure, a video coding method is provided. The video coding method comprises: constructing a candidate list of a current coding block in a preset prediction mode, wherein the candidate list contains a plurality of candidate motion vectors; acquiring a final optimal motion vector of the current coding block based on the candidate list, wherein the final optimal motion vector is obtained by using a prediction method according to the first aspect described above; selecting one of the plurality of candidate motion vectors as a predictive motion vector, and coding the current coding block based on the predictive motion vector and the final optimal motion vector.

In some embodiments, said constructing a candidate list of a current coding block in a preset prediction mode comprises: constructing, in the preset prediction mode, a candidate list of the current coding block corresponding to a second preset number of pixel accuracies; wherein said selecting one of the plurality of candidate motion vectors as a predictive motion vector comprises: using each of the candidate motion vectors in the candidate list corresponding to the second preset number of pixel accuracies as a target motion vector; acquiring a motion vector difference between the target motion vector and the final optimal motion vector; counting first coded bit overhead of the motion vector difference corresponding to the target motion vector, and second coded bit overhead of pixel accuracies corresponding to the target motion vector; taking a sum of the first coded bit overhead and the second coded bit overhead corresponding to the target motion vector, as coded bit overhead corresponding to the target motion vector; using a corresponding target motion vector with the smallest coded bit overhead as the predictive motion vector.

In some embodiments, the first coded bit overhead of the motion vector difference is the number of bits of the motion vector difference after being coded, and the second coded bit overhead of the pixel accuracies is the number of bits of the pixel accuracies after being coded.

In some embodiments, said acquiring a motion vector difference between the target motion vector and the final optimal motion vector comprises: saturating the final optimal motion vector with a 16*N times pixel accuracy, and saturating the target motion vector with the 16*N times pixel accuracy, wherein the N is a corresponding pixel accuracy of the target motion vector; calculating a vector difference between the saturated final optimal motion vector and the saturated target motion vector, as the motion vector difference.

In some embodiments, said coding the current coding block based on the predictive motion vector and the final optimal motion vector comprises: using the motion vector difference and pixel accuracy corresponding to the predictive motion vector, and an index value of the predictive motion vector in the candidate list, to carry out syntax element expression of the final optimal motion vector; coding the current coding block based on the syntax element expression.

In some embodiments, the second preset number of pixel accuracies include at least an integer pixel accuracy, and wherein said constructing a candidate list of the current coding block corresponding to a second preset number of pixel accuracies comprises: constructing a first candidate list of the current coding block corresponding to the integer pixel accuracy, wherein the first candidate list contains a plurality of first candidate motion vectors; taking other pixel accuracies in the second preset number of pixel accuracies than the integer pixel accuracy, each as a second target pixel accuracy; converting each of the pixel accuracies of the plurality of first candidate motion vectors in the first candidate list into the second target pixel accuracy to obtain a second candidate list corresponding to the second target pixel accuracy; using a combination of the first candidate list and the second candidate list as a candidate list corresponding to the second preset number of pixel accuracies.

In some embodiments, the selecting one of the plurality of candidate motion vectors as a predictive motion vector, and coding the current coding block based on the predictive motion vector and the final optimal motion vector comprises: obtaining a final optimal motion vector corresponding to chrominance component based on the final optimal motion vector corresponding to the luminance component; selecting one from the plurality of candidate motion vectors included in the candidate list corresponding to the chrominance component, as a predictive motion vector corresponding to the chrominance component; coding the current coding block based on the predictive motion vector and the final optimal motion vector corresponding to the luminance component and the predictive motion vector and the final optimal motion vector corresponding to the chrominance component.

In some embodiments, the video coding method further comprises: obtaining a candidate list and final optimal motion vector corresponding to the chrominance component based on an accuracy ratio of the chrominance component and the luminance component in video color space used.

In a third aspect of the present disclosure, a motion vector prediction apparatus is provided. The motion vector prediction apparatus comprises: a memory and a processor coupled to each other, where the memory is configured to store program instructions and the processor is configured to execute the program instructions to implement a prediction method according to the first aspect described above.

In a fourth aspect of the present disclosure, a video coding apparatus is provided. The video coding apparatus comprises: a memory and a processor coupled to each other, where the memory is configured to store program instructions and the processor is configured to execute the program instructions to implement a video coding method according to the second aspect described above.

In a fifth aspect of the present disclosure, a storage device is provided. The storage device has stored thereon program instructions which can be executed by a processor to implement a prediction method according to the first aspect described above or to implement a video coding method according to the second aspect described above.

For ease of understanding, a plurality of preset prediction modes mentioned in the following disclosure are described first.

I. Conventional AMVP Mode

In a conventional AMVP mode, a method of constructing a candidate list containing candidate motion vectors (MVs) is specifically as follows.

In the conventional AMVP mode, a length of the candidate list is 2, that is, the number of candidate motion vectors included in the candidate list is 2.

Reference is made to FIG. 1, which is a schematic diagram of a position relationship between a current coding block and a spatial-domain block according to motion vector prediction method embodiments of the present disclosure. A motion vector (MV) is acquired in each of left and upper adjacent blocks of the current coding block and added to a candidate list. A check sequence of the left adjacent blocks is A0→A1, and a check sequence of the upper adjacent blocks is B0→B1→B2. When reference frames of the adjacent blocks and the current coding block are a same frame, motion vectors (MVs) of the adjacent blocks are added to the candidate list. When a first available candidate motion vector is checked on the left (or upper) side, the candidate motion vector is added to the candidate list, and check of other adjacent blocks on the left (or upper) side is skipped.

Figure 2:
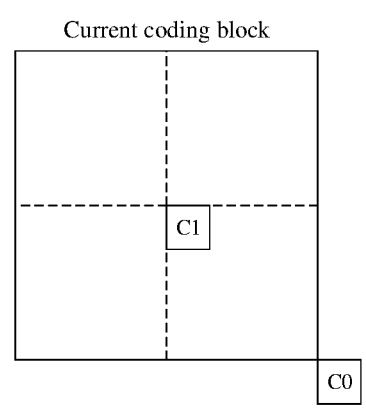
FIG. 2 is a schematic diagram of a position relationship between a current coding block and a temporal-domain block according to motion vector prediction method embodiments of the present disclosure.
Figure 3:
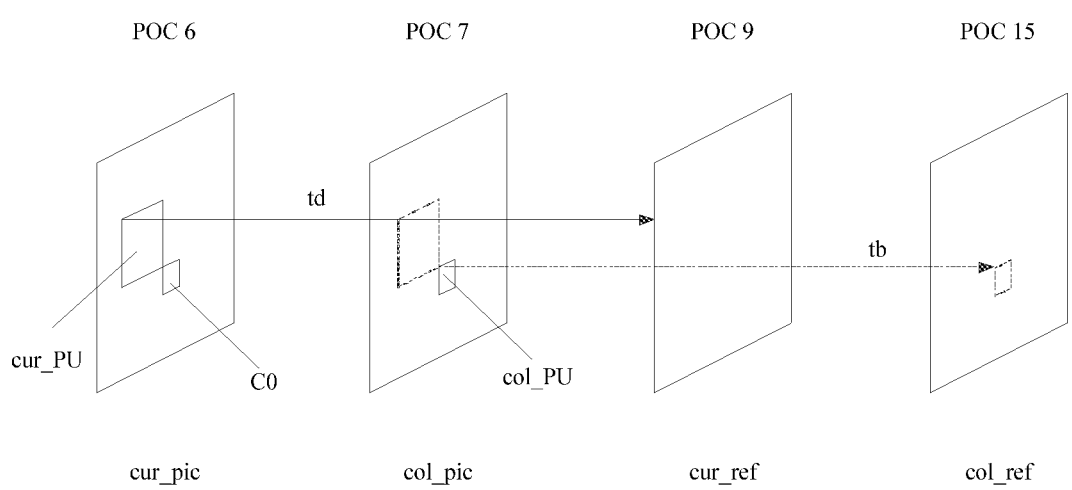
FIG. 3 is a schematic diagram of tempora-domain motion vector scaling according to motion vector prediction method embodiments of the present disclosure.

When a size of the current coding block is larger than 4*4, 8*4, 4*8, a temporal-domain motion vector is obtained and added to the candidate list. The temporal domain can only provide one motion vector at most. Reference is made to FIG. 2, which is a schematic diagram of a position relationship between a current coding block and a temporal-domain block according to motion vector prediction method embodiments of the present disclosure. As shown in FIG. 2, a motion vector of a co-located block (col_CU) at the position of C0 in a co-located frame (col_pic) at in FIG. 2 is obtained via scaling. If the co-located block at the position of C0 is not available, a co-located block at the position of C1 is adopted for replacement. Scaling of the acquired temporal-domain motion vector may be referred to in FIG. 3. FIG. 3 is a schematic diagram of temporal-domain motion vector scaling according to motion vector prediction method embodiments of the present disclosure. As shown in FIG. 3, cur_PU represents a current coding block; col_PU is a co-located block thereof; td and tb represent a distance between a current image cur_pic and its reference image cur_ref and a distance between a co_located image col_pic, and its reference image col_ref, respectively. A final temporal-domain motion vector can be obtained by the following formula:

$$curMV=(td/tb)*colMV$$

wherein colMV is the motion vector of the co-located block, and curMV represents the temporal-domain motion vector finally obtained.

If the candidate list is not full yet, it is further needed to fill it with History-based Motion Vector Predictions (HMVPs). The coded block herein refers to a coded inter block in a current coding tree unit (CTU). Further, it is required that reference frames of the current coding block and the coded block should be the same. The candidate list is filled with the recent 4 motion vectors in the HMVP list according to a last-in and first-out sequence, until the candidate list is full.

If the candidate list is not full yet, the remaining MVs in the candidate list are filled with zero MVs.

II. Affine AMVP Mode

Figure 4:
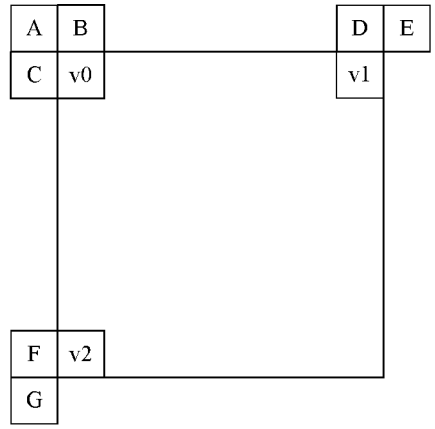
FIG. 4 is a schematic diagram of positions of control points according to motion vector prediction method embodiments of the present disclosure.

In the affine AMVP mode, MVs of each sub-block in the current coding block can be different, and the MVs of each sub-block are obtained via weighting of MVs of two (v0, v1) or three (v0, v1, v2) control points (CPs), where the MV of each CP is called CPMV (control point's MV). For positions of the three CPs, reference may be made to FIG. 4, which is a schematic diagram of positions of control points according to motion vector prediction method embodiments of the present disclosure.

A group of CPMVs are selected from each of the left and upper adjacent blocks and added to the candidate list. Adjacent blocks G and F are checked in sequence on the left side, and adjacent blocks E, D and A are checked in sequence on the upper side. When a certain block is checked to exist and an affine mode is used, and reference frames of the current coding block and the adjacent block are identical, a CPMV combination of the adjacent block is selected and added to the CPMV candidate list after passing through an affine formula. Further, the remaining adjacent blocks on said side are no longer checked.

Adjacent blocks of each CP are checked respectively in a sequence of v0, v1 and v2. A check sequence of v0 is A→B→C; a check sequence of v1 is D→E; and a check sequence of v2 is F→G. When adjacent blocks are checked to exist and inter prediction is adopted, MVs of the block are selected as CPMVs of the CP. If the number of candidate CPMV combinations is less than 2, the first available CPMVs are taken as CPMVs of all CPs in a sequence of v2, v1, v0, and added as a CPMV combination to the candidate list.

The CPMVs are acquired from the temporal-domain reference point, and are obtained by scaling the MVs of the co-located block at the position of C0 in FIG. 2. The scaling method is the same as a method of temporal-domain MV scaling in a conventional AMVP, and details are omitted herein. If the co-located block at the position of C0 is not available, the co-located block at the position of C1 is adopted for replacement. The acquired temporal-domain MVs will be regarded as CPMVs of all CP points and added as a CPMV combination to the candidate list.

Zero MVs are used to fill all the CPMVs and added as a combination to the CPMV candidate list.

III. AMVP Mode Based on Intra Block Copy (IBC)

A candidate list of an AMVP mode based on intra block copy (abbreviated as IBC_AMVP in this embodiment and the following embodiments, unless otherwise specified) includes two candidate motion vectors. The position relationship of the adjacent blocks of the current coding block is shown in FIG. 1. MVs of an adjacent block that exists and is an IBC block (that is, the mode is an IBC_AMVP mode or an IBC_Merge mode) are used to fill the candidate in turn in a sequence of A1→B1, until the candidate list is full.

When the candidate list is not full yet, the MVs in the HMVP list of the coded block are sequentially compared with the MVs in the spatial domains A1 and B1, and different MVs are used to fill the candidate list, until the candidate list is full.

If the candidate list is not full yet, the remaining MVs in the candidate list are filled with zero MVs.

IV. AMVP Mode Based on Hash

A Hash inter mode searches for match blocks with a same Hash value in the reference frames according to the Hash value of the current block, and obtains corresponding MVs.

A method of constructing an MV candidate list of the Hash AMVP mode is the same as that of the conventional AMVP mode, but the Hash AMVP mode only needs to construct an MV candidate list of ¼ pixel, integer pixel and 4 times integer pixel accuracies.

A motion search of the Hash AMVP mode is based on the Hash value of each coding block.

A 4×4 coding block is divided into four 2×2 blocks. A Cyclic Redundancy Check (CRC) value of each 2×2 block is calculated separately. Then, the 4 Hash values are merged into a total Hash value as a Hash value of the current 4*4 block.

Other N×N (N>4) coding block is divided into M 4×4 blocks. A CRC (Cyclic Redundancy Check) value of each 4×4 block is calculated separately. Then, the M Hash values are merged into a total Hash value as the Hash value of the current N×N block.

Hash values of all blocks having the same size as the current block in the reference frames are calculated, and match blocks having the same Hash value as the current block are sought from a forward/backward reference frame. Assuming a plurality of match blocks are found, MVs of each match block are obtained, and a comparison is made between RDCOST costs composed of the number of bits and luminance distortion SATD required by the motion vector difference Motion Vector Difference (MVD) (MV-AMVP) in an integer pixel accuracy, a 4 times accuracy and a ¼ accuracy. The MV with the smallest RDCOST cost is an optimal MV.

Figure 5:
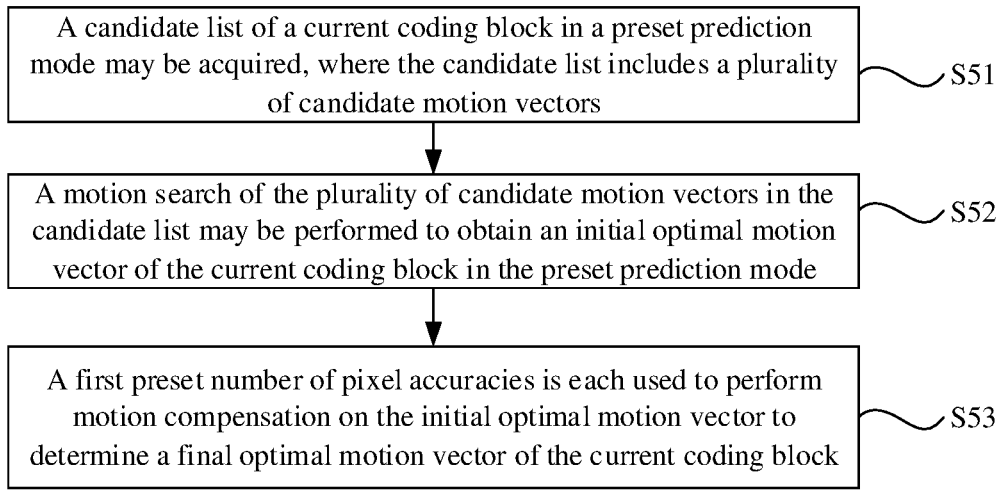
FIG. 5 is a flow diagram of an embodiment of a motion vector prediction method of the present disclosure.

Reference is made to FIG. 5, which is a flow diagram of an embodiment of a motion vector prediction method of the present disclosure. Specifically, the following steps may be included.

In operation S51, a candidate list of a current coding block in a preset prediction mode may be acquired, where the candidate list includes a plurality of candidate motion vectors.

In the present embodiment, the preset prediction mode includes any one of a plurality of prediction modes. In an implementation scenario, the plurality of prediction modes may include: a conventional AMVP mode, an affine AMVP mode, an AMVP mode based on intra block copy (i.e., IBC_AMVP mode), and a Hash AMVP mode. The candidate list may be constructed in advance. For a specific manner of constructing the candidate list in the foregoing preset prediction mode, reference may be made to relevant steps in the foregoing embodiment, which will not be detailed herein.

In operation S52, a motion search of the plurality of candidate motion vectors in the candidate list may be performed to obtain an initial optimal motion vector of the current coding block in the preset prediction mode.

In an implementation scenario, in order to simplify the process of performing a motion search of candidate motion vectors of different pixel accuracies, it is possible to acquire a candidate list of the current coding block corresponding to the integer pixel accuracy in the preset prediction mode, and to perform a motion search of the plurality of candidate motion vectors in the candidate list through the integer pixel accuracy to obtain an initial optimal motion vector.

In a specific implementation scenario, with the preset prediction mode including a conventional AMVP mode as an example, it is possible to perform a motion search of the plurality of candidate motion vectors in the candidate list and to conduct implementation by use of a TZ search method. Specifically, it is possible to perform motion compensation on the candidate motion vectors in the candidate list and to calculate the Rate Distortion costs (RDCOSTs) based on Sum of Absolute Difference (SAD) thereof. Then, the candidate motion vector with the smallest RDCOST is selected as a starting motion vector of the TZ search. The TZ search is performed with the starting motion vector. Each search acquires match blocks having the same size as the current block. Difference between the pixels of the match blocks and the original pixel value of the current coding block is made to obtain RDCOSTs based on SAD, and the MV with the smallest RDCOST is selected as the initial optimal motion vector.

In another specific implementation scenario, with the preset prediction mode including an affine AMVP mode as an example, optical flow may be used to update the CPMVs. Specifically, according to a position relationship between the center point and the CP point of each 4*4 sub-block, a CPMV affine method may be used to obtain the MVs of each sub-block. After each sub-block acquires the MVs, a prediction of each sub-block is acquired through a motion compensation difference filter, and the predictions of all the sub-blocks are combined to derive a pixel value of the entire match block. Difference between the pixel values of the match blocks and the original pixel value of the current coding block is made to obtain RDCOSTs based on Sum of Absolute Transformed Difference (SATD), and the CPMV with the smallest RDCOST is selected as Control Point's Motion Vector Prediction (CPMVP). The CPMVP is used to iteratively update CPMV based on optical flow. During each iteration, affine model parameters and CPMVs are updated based on the optical flow and gradient information, and the SATD-based RDCOST of the CPMV for each iteration is calculated. The CPMV combination with the smallest RDCOST is selected from multiple iterations as the initial optimal motion vector.

In a specific implementation scenario, with the preset prediction mode including an IBC_AMVP mode as an example, the initial optimal motion vector may be acquired not only by use of a method of motion search, but also by use of a method of Hash matching. Specifically, a Hash value may be constructed for each 4*4 block according to the pixel value, and blocks with a same hash value indicate that the pixels in the two 4*4 blocks are perfectly identical. If the Hash matching fails to find the initial optimal motion vector of IBC_AMVP, the initial optimal motion vector can be obtained by use of the method of motion search. For details, refer to the related steps described above.

In addition, if the preset prediction mode includes the Hash AMVP mode, the method of Hash matching can be used to perform the motion search. For details, refer to the relevant steps in the foregoing embodiment.

In operation S53, a first preset number of pixel accuracies is each used to perform motion compensation on the initial optimal motion vector to determine a final optimal motion vector of the current coding block.

In the present embodiment, pixel accuracies used in any one of the prediction modes are identical. For example, when the first preset number is 3, pixel accuracies used in any one of the preset prediction modes may include: a ¼ pixel accuracy, a ¹⁄₁₆ pixel accuracy, and an integer pixel accuracy. Alternatively, for example, when the first preset number is 4, pixel accuracies used in any one of the preset prediction modes may include: a ¼ pixel accuracy, a ¹⁄₁₆ pixel accuracy, an integer pixel accuracy, and a 4 times pixel accuracy.

In an implementation scenario, in order to expand the prediction range thereby to improve the prediction accuracy, the first preset number is an integer and not less than 3, for example, 3, 4, 5, 6, or the like. Specifically, the aforementioned pixel accuracies may include, but are not limited to: a ¹⁄₁₆ pixel accuracy, a ⅛ pixel accuracy, a ¼ pixel accuracy, a ½ pixel accuracy, an integer pixel accuracy, a 2 times pixel accuracy, a 4 times pixel accuracy, a 8 times pixel accuracy, and 16 times pixel accuracy.

In an implementation scenario, in order to save the quantity of subsequent coding data, pixel accuracy identifiers or IMVs may be used to represent different pixel accuracies. Specifically, bypass coding or context coding can be used to perform coding of different pixel accuracies to obtain corresponding pixel accuracy identifiers or IMVs. In a specific implementation scenario, reference is made to Table 1, which is a table illustrating a relationship between the pixel accuracy identifiers using bypass coding and the pixel accuracies corresponding thereto.

TABLE 1 a table of a relationship between the pixel accuracy identifiers using bypass coding and the pixel accuracies corresponding thereto

| Pixel Accuracy Identifier or IMV | Coded Bit Stream | Corresponding Pixel Accuracy |
|---|---|---|
| 0 | 0 | ¹⁄₁₆ |
| 1 | 10 | ⅛ |
| 2 | 110 | ¼ |
| 3 | 1110 | ½ |
| 4 | 11110 | 1 (i.e., an integer pixel accuracy) |

TABLE 1-continued a table of a relationship between the pixel accuracy identifiers using bypass coding and the pixel accuracies corresponding thereto

| Pixel Accuracy Identifier or IMV | Coded Bit Stream | Corresponding Pixel Accuracy |
|---|---|---|
| 5 | 11111 | 4 |

In an implementation scenario, in order to further reduce the software and hardware implementation difficulty of motion vector prediction, in any preset prediction mode, a same pixel accuracy corresponds to a same pixel accuracy identifier used to represent the pixel accuracy. For example, in the above-mentioned conventional AMVP mode, affine AMVP mode, IBC_AMVP mode, and Hash AMVP mode, when IMV is 0, they all correspond to the ¹⁄₁₆ pixel accuracy; when IMV is 1, they all correspond to the ⅛ pixel accuracy; and when the IMV is 2, they all correspond to the ¼ pixel accuracy. For other IMVs, it is possible to deduce by analogy, and this embodiment will not give examples one by one herein.

In a specific implementation scenario, with the preset prediction mode including the conventional AMVP mode, and the first preset number of pixel accuracies including the ¼ pixel accuracy, the integer pixel accuracy, the 4 times pixel accuracy and the ½ pixel accuracy as an example, the initial optimal motion vector obtained by the motion search can be taken as a starting motion vector, and the first preset number of pixel accuracies are each used to offset the starting motion vector. For example, when the starting motion vector is offset by the ½ pixel accuracy, the offset vectors can include at least one of the following: (0, 0), (−½, 0), (0, −½), (½, 0), (0, ½), (−½, −½), (½, −½), (−½, ½), (½, ½). For other pixel accuracies, it is possible to deduce by analogy, and no more examples are given herein. Accordingly, the motion vector with the smallest RDCOST is selected from the plurality of offset motion vectors, as a final optimal motion vector, and motion compensation between different pixel accuracies involves no dependence, which is also conductive to improving the prediction accuracy.

In another specific implementation scenario, with the preset prediction mode including the affine AMVP mode and the first preset number of pixel accuracies including the ¼ pixel accuracy, the integer pixel accuracy, the 4 times pixel accuracy, and the ½ pixel accuracy as an example, after the initial optimal motion vector (i.e., the initial optimal CPMV) is obtained through the motion search, the CPMV may be subjected to the following offset vectors: (−offset, −offset), (−offset, offset), (offset, offset), (offset, −offset), (−offset, 0), (0, −offset), (0, offset), (offset, 0), where offset represents a pixel accuracy. Thus, the motion vector with the smallest RDCOST is selected as the final optimal motion vector.

In still another specific implementation scenario, it is also possible to acquire a candidate list of the current coding block in each of at least two modes of the conventional AMVP mode, the affine AMVP mode, the IBC_AMVP mode, and the Hash AMVP mode, and to acquire the final optimal motion vectors and the corresponding rate-distortion costs (RDCOST) in the at least two modes on the basis of the above operations S12 and S13. Then, the final optimal motion vector with the smallest RDCOST is selected as the final optimal motion vector of the current coding block.

In the above solution, a candidate list of a current coding block in a preset prediction mode is acquired, where the candidate list includes a plurality of candidate motion vectors. Then, a motion search of the plurality of candidate motion vectors in the candidate list is performed to obtain an initial optimal motion vector of the current coding block in the preset prediction mode. Further, a first preset number of pixel accuracies are each used to perform motion compensation on the initial optimal motion vector to determine a final optimal motion vector of the current coding block. The preset prediction mode includes any one of a plurality of prediction modes, and pixel accuracies used in any prediction mode are identical. Accordingly, it is possible to make the pixel accuracies used in the plurality of prediction modes consistent and processing loops used in the plurality of prediction modes consistent to reduce the software and hardware implementation difficulty of motion vector prediction, which is conducive to improving the prediction accuracy.

Figure 6:
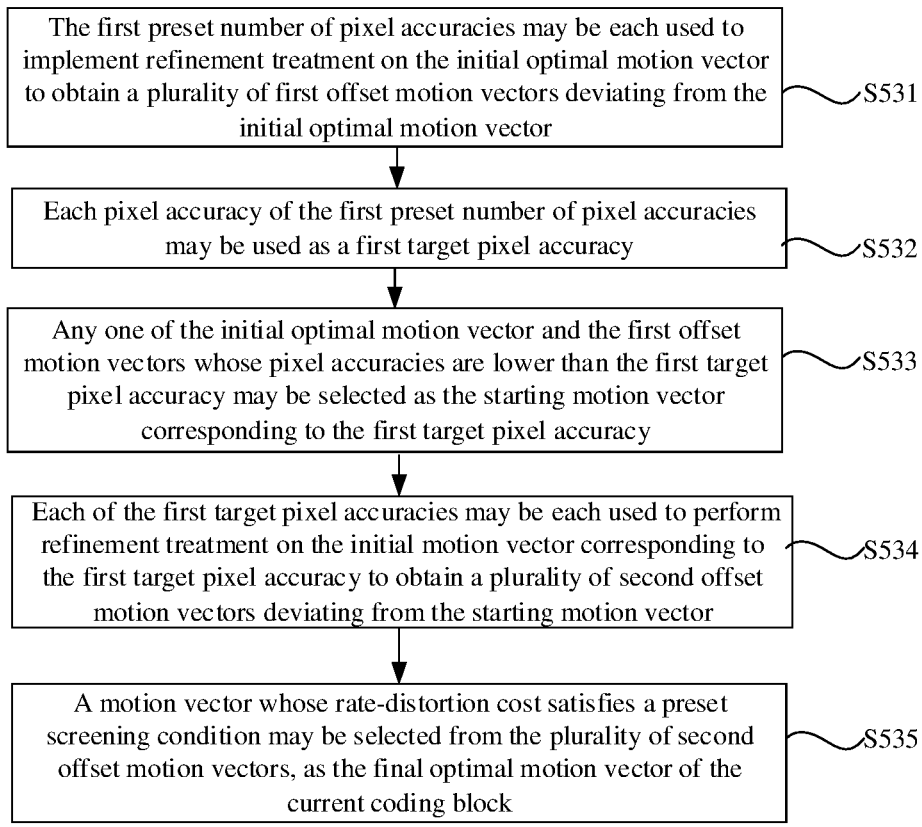
FIG. 6 is a flow diagram of an embodiment of the operation S53 in FIG. 5.

Reference is made to FIG. 6, which is a flow diagram of an embodiment of the operation S53 in FIG. 5. Specifically, in the motion compensation process, it is possible not only to use the initial optimal motion vector obtained by the motion search as the starting motion vector, but also to use other motion vector as the starting motion vector, thereby expanding the prediction range and being conductive to improving the prediction accuracy. In particular, the following steps may be included.

In operation S531, the first preset number of pixel accuracies may be each used to implement refinement treatment on the initial optimal motion vector to obtain a plurality of first offset motion vectors deviating from the initial optimal motion vector.

In the present embodiment, the refinement treatment comprises offsetting by use of at least one offset vector. Horizontal component and vertical component of the offset vector include any one of pixel accuracies and 0, and at least one of the horizontal component and the vertical component is not 0. Offset directions of the offset vector include any of the following: right, left, lower, upper, right lower, left lower, right upper, and left upper. In this embodiment, both the horizontal component and the vertical component refer to absolute values. With the first preset number of pixel accuracies including an integer pixel accuracy, and the initial optimal motion vector (1,1) as an example, when the initial optimal motion vector (1,1) is refined with the integer pixel accuracy, it is possible to use at least one of the following offset vectors: an offset vector (1, 0) whose offset direction is right, an offset vector (−1, 0) whose offset direction is left, and an offset vector (0, −1) whose offset direction is lower, an offset vector (0, 1) whose offset direction is upper, an offset vector (1, −1) whose offset direction is right lower, an offset vector (−1, −1) whose offset direction is left lower, an offset vector (1,1) whose offset direction is right upper, and an offset vector (−1, 1) whose offset direction is left upper. Thus, after the above offset vectors are each used to offset the initial optimal motion vector (1, 1), it is possible to obtain the first offset motion vectors: (2, 1), (0, 1), (1, 0), (1, 2), (2, 0), (0, 0), (2, 2,) and (0, 2). For other pixel accuracies, it is possible to deduce by analogy.

In operation S532, each pixel accuracy of the first preset number of pixel accuracies may be used as a first target pixel accuracy.

For example, when the first preset number of pixel accuracies include a ¼ pixel accuracy, an integer pixel accuracy, a 4 times pixel accuracy, and a ½ pixel accuracy, it is possible to use each of the ¼ pixel accuracy, the integer pixel accuracy, the 4 times pixel accuracy and the ½ pixel accuracy as the first target pixel accuracy. When the first reset number of pixel accuracies include other pixel accuracies, it is possible to deduce by analogy, and no examples are given herein.

In operation S533, any one of the initial optimal motion vector and the first offset motion vectors whose pixel accuracies are lower than the first target pixel accuracy may be selected as the starting motion vector corresponding to the first target pixel accuracy.

Still with the first preset number of pixel accuracies including the ¼ pixel accuracy, the integer pixel accuracy, the 4 times pixel accuracy, and the ½ pixel accuracy as an example, when the first target pixel accuracy is an integer pixel accuracy, it is possible to select any one of the initial optimal motion vector and the first offset motion vectors corresponding to the 4 times the pixel accuracy lower than the integer pixel accuracy, as a starting motion vector corresponding to the integer pixel accuracy. Other circumstances can be concluded similarly, and examples are not listed herein.

In operation S534, each of the first target pixel accuracies may be each used to perform refinement treatment on the initial motion vector corresponding to the first target pixel accuracy to obtain a plurality of second offset motion vectors deviating from the starting motion vector.

Still with the first target pixel accuracy being the integer pixel accuracy as an example, the integer pixel accuracy can be used to perform refinement treatment on the starting motion vector. For details, reference may be made to the aforementioned related steps in the present embodiment. Through the refinement treatment, it is possible to obtain a plurality of second offset motion vectors deviating from the starting motion vector.

When other pixel accuracies in the first preset number of pixel accuracies are each used as the first target pixel accuracy, a plurality of second offset motion vectors corresponding to the other pixel accuracies may be obtained correspondingly.

In operation S535, a motion vector whose rate-distortion cost satisfies a preset screening condition may be selected from the plurality of second offset motion vectors, as the final optimal motion vector of the current coding block.

In the present embodiment, the preset screening condition includes a smallest rate-distortion cost. That is, the motion vector with the smallest rate-distortion cost is selected from the plurality of second offset motion vectors, as the final optimal motion vector of the current coding block.

Distinct from the foregoing embodiment, the first preset number of pixel accuracies are each used to perform refinement treatment on the initial optimal motion vector to obtain a plurality of first offset motion vectors deviating from the initial optimal motion vector. With each pixel accuracy of the preset number of pixel accuracies as the first target pixel accuracy, any of the initial optimal motion vector and the first offset motion vectors whose pixel accuracies are lower than the first target pixel accuracy is selected as a starting motion vector corresponding to the first target pixel accuracy. The first target pixel accuracies are each used to perform refinement treatment on the starting motion vectors corresponding thereto to obtain a plurality of second offset motion vectors deviating from the starting motion vector. Then, a motion vector whose rate-distortion cost satisfies the preset screening condition is selected from the plurality of second offset motion vectors, as the final optimal motion vector of the current coding block, thereby making it possible to expand the motion vectors that may be thoroughly checked in the motion compensation process and to improve the prediction accuracy.

Figure 7:
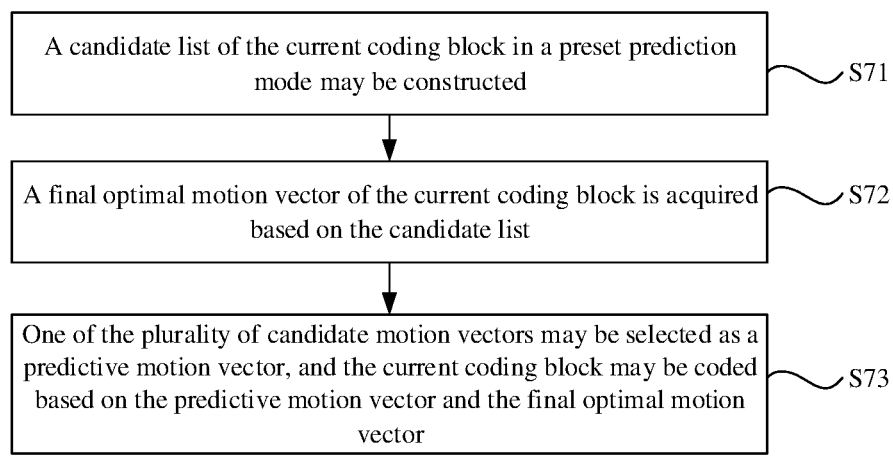
FIG. 7 is a flow diagram of an embodiment of a video coding method of the present disclosure.

Reference is made to FIG. 7, which is a flow diagram of an embodiment of a video coding method of the present disclosure. Specifically, the following steps may be included.

In operation S71, a candidate list of the current coding block in a preset prediction mode may be constructed.

In this embodiment, the candidate list contains a plurality of candidate motion vectors. For details, refer to the relevant steps in the foregoing embodiments.

In operation S72, a final optimal motion vector of the current coding block is acquired based on the candidate list.

In this embodiment, the final optimal motion vector is acquired by using the steps in any motion vector prediction method embodiment.

For details, refer to the relevant steps in the foregoing embodiments.

In operation S73, one of the plurality of candidate motion vectors may be selected as a predictive motion vector, and the current coding block may be coded based on the predictive motion vector and the final optimal motion vector.

One of the candidate motion vectors in the candidate list is selected as the predictive motion vector, and the current coding block is coded based on the predictive motion vector and the final optimal motion vector. For example, a MVD (motion vector difference) may be obtained based on the predictive motion vector and the final optimal motion vector, and syntax element expression is carried out on the final optimal motion vector based on an index value of the predictive motion vector in the candidate list. Thus, the current coding block is coded based on the syntax element expression.

In a specific implementation scenario, the above-mentioned candidate list and the final optimal motion vector obtained by prediction may both correspond to luminance component. On the basis of the above, in order to implement coding of the current coding block, it is also possible to obtain a final optimal motion vector corresponding to chrominance component based on the final optimal motion vector corresponding to the luminance component, to select one from the plurality of candidate motion vectors included in the candidate list corresponding to the chrominance component, as a predictive motion vector corresponding to the chrominance component, and to code the current coding block based on the predictive motion vector and final optimal motion vector corresponding to the luminance component and the predictive motion vector and final optimal motion vector corresponding to the chrominance component. Specifically, it is possible to obtain a candidate list and final optimal motion vector corresponding to the chrominance component based on an accuracy ratio of the chrominance component and the luminance component in video color space used. For example, as for YUV420, an accuracy of the corresponding chrominance component is half of that of the luminance component. That is, when the pixel accuracy of the luminance component is a $1/16$ pixel, a pixel accuracy of the corresponding chrominance component is $1/32$; or when the pixel accuracy of the luminance component is a $1/8$ pixel, a pixel accuracy of the corresponding chrominance component is $1/16$; or the like. On such basis, the pixel accuracies represented by the respective pixel accuracy identifiers or IMVs in Table 1 are corresponding pixel accuracies of the luminance component, and the pixel accuracies of the corresponding chrominance component are half of the pixel accuracies of the luminance component. For example, when IMV=0, the corresponding pixel accuracy of the luminance component is $1/16$, and the corresponding pixel accuracy of the chrominance component is $1/32$; or when IMV=1, the corresponding pixel accuracy of the luminance component is $1/8$, and the corresponding pixel accuracy of the chrominance component is $1/16$; or, when IMV=2, the corresponding pixel accuracy of the luminance component is $1/4$, and the corresponding pixel accuracy of the chrominance component is $1/8$; or, when IMV=3, the corresponding pixel accuracy of the luminance component is $1/2$, and the corresponding pixel accuracy of the chrominance component is $1/4$; or, when IMV=4, the corresponding pixel accuracy of the luminance component is 1, and the corresponding pixel accuracy of the chrominance component is $1/2$; or, when IMV=5, the corresponding pixel accuracy of the luminance component is 4, and the corresponding pixel accuracy of the chrominance component is 2. For other circumstance, it is possible to deduce by analogy, and examples will not be given one by one herein.

In the above solution, a candidate list of a current coding block in a preset prediction mode is constructed, where the candidate list contains a plurality of candidate motion vectors. Then, based on the candidate list, a final optimal motion vector of the current coding block is obtained, and the final best motion vector is obtained by using the steps in any of the above-mentioned motion vector prediction method embodiments. Further, one of the plurality of candidate motion vectors is selected as a predictive motion vector, and the current coding block is coded based on the predictive motion vector and the final optimal motion vector. Thereby, it is possible to reduce the software and hardware implementation difficulty of motion vector prediction, which is conductive to optimizing the quality of video coding.

Figure 8:
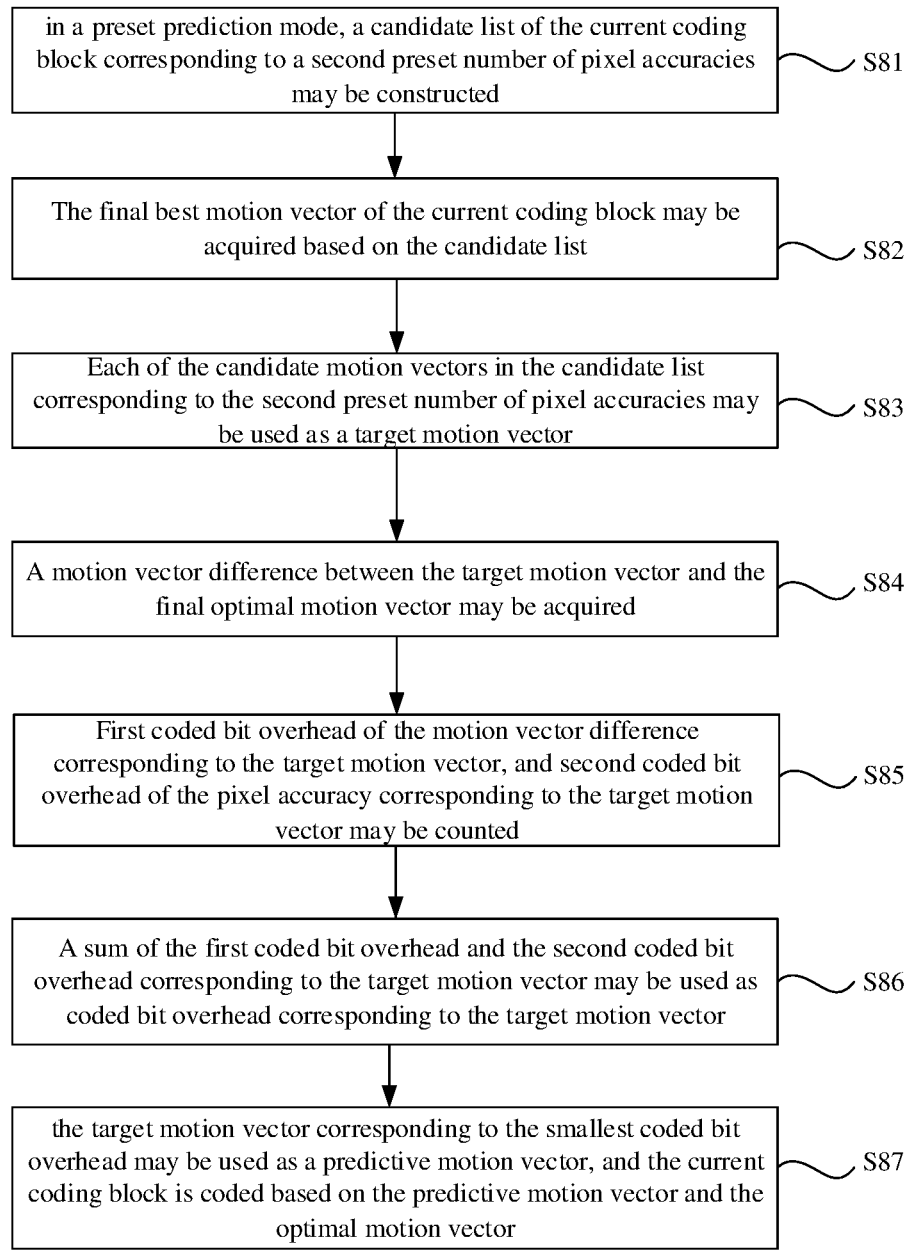
FIG. 8 is a flow diagram of another embodiment of a video coding method of the present disclosure.

Reference is made to FIG. 8, which is a flow diagram of another embodiment of a video coding method of the present disclosure. Specifically, the following steps may be included.

In operation S81, in a preset prediction mode, a candidate list of the current coding block corresponding to a second preset number of pixel accuracies may be constructed.

In an implementation scenario, in order to facilitate subsequently acquiring a final optimal motion vector of the current coding block based on the candidate list, the second preset number of pixel accuracies include at least an integer pixel accuracy. A process of constructing a candidate list corresponding to the integer pixel accuracy may be specifically referred to in the relevant steps in the foregoing embodiments, and details are omitted herein. In a specific implementation scenario, the second preset number may be the same as the first preset number in the foregoing embodiments, for example, both are 3, or 4, without any limitation set herein.

A candidate list corresponding to other pixel accuracies of the second preset number of pixel accuracies than the integer pixel accuracy may be constructed based on the candidate list corresponding to the integer pixel accuracy. Specifically, a first candidate list of the current coding block corresponding to the integer pixel accuracy can be constructed first. Therein, the first candidate list contains a plurality of first candidate motion vectors. Other pixel accuracies of the second preset number of pixel accuracies than the integer pixel accuracy are each used as a second target pixel accuracy. Each of the pixel accuracies of the plurality of candidate motion vectors in the first candidate list is converted to the second target pixel accuracy to obtain a second candidate list corresponding to the second target pixel accuracy. Then, a combination of the first candidate list and the second candidate list are used as a candidate list corresponding to the second preset number of pixel accuracies. With the motion vector (1, 1) corresponding to the integer pixel accuracy as an example, after being converted to a ½ pixel accuracy, it becomes (2, 2), and after being converted to a ¼ pixel accuracy, it becomes (4, 4). When the second target pixel accuracy is other pixel accuracy, it is possible to deduce by analogy, and examples will not be given one by one herein.

In operation S82, the final best motion vector of the current coding block may be acquired based on the candidate list.

In this embodiment, the final optimal motion vector is obtained by using the steps in any of the foregoing motion vector prediction method embodiments. Specifically, the final optimal motion vector of the current coding block is obtained based on the candidate list corresponding to the integer pixel accuracy.

For details, refer to the relevant steps in the foregoing embodiments.

In operation S83, each of the candidate motion vectors in the candidate list corresponding to the second preset number of pixel accuracies may be used as a target motion vector.

Each candidate motion vector in the candidate list corresponding to the second preset number of pixel accuracies is used as a target motion vector.

In operation S84, a motion vector difference between the target motion vector and the final optimal motion vector may be acquired.

A motion vector difference (MVD) between the target motion vector and the final optimal motion vector is acquired. For example, when the target motion vector is (1, 2) and the final optimal motion vector is (2, 2), the motion vector difference is (1, 0); or when the target motion vector is (1, 1) and the final optimal motion vector is (1.5, 1.5), the motion vector difference is (0.5, 0.5). For other circumstances, it is possible to deduce by analogy, and examples will not be given one by one herein.

In an implementation scenario, in order that motion vectors corresponding to sub-pixel accuracies other than the integer pixel accuracy can still be expressed as integers to reduce the coding difficulty and increase the data compression rate, the final optimal motion vector can be saturated with a 16 times pixel accuracy, and the target motion vector of the N times pixel accuracy is saturated with a 16*N times pixel accuracy. Then, the target motion vector of 16*N times pixel accuracy is subtracted from the final optimal motion vector of the 16 times pixel accuracy to obtain MVD. Next, the MVD is saturated with the 16*N times pixel accuracy. However, when N is not 1, the MVD may cause errors in the saturation process. In a specific implementation scenario, in order to avoid errors, the final optimal motion vector can be saturated with the 16*N times pixel accuracy, and the target motion vector can be saturated with the 16*N times pixel accuracy. A vector difference between the saturated final optimal motion vector and the saturated target motion vector is calculated as a motion vector difference. For example, the target motion vector (1.25, 1.75) of the integer pixel accuracy becomes (16, 32) after being saturated with the 16*N times pixel accuracy, and the final optimal motion vector (1.5, 1.5) becomes (24, 24) after being saturated with the 16*N times pixel accuracy, so that the corresponding motion vector difference is (8, 8). Alternatively, for example, the target motion vector (1.25, 1.75) of the ¼ pixel accuracy becomes (20, 28) after being saturated with the 16*N times pixel accuracy, and the final optimal motion vector (1.5, 1.5) become (24, 24) after being saturated with the 16*N times pixel accuracy, so that the corresponding motion vector difference is (4, 4). For other cases, it is possible to deduce by analogy, and examples will not be given one by one herein.

In operation S85, first coded bit overhead of the motion vector difference corresponding to the target motion vector, and second coded bit overhead of the pixel accuracy corresponding to the target motion vector may be counted.

The first coded bit overhead of the motion vector difference is the number of bits of the motion vector difference after being coded, and the second coded bit overhead of the pixel accuracy is the number of bits of the pixel accuracy after being coded.

With the motion vector difference (8, 8) as an example, it becomes (1000, 1000) after binary coding, so the first coded bit overhead of the motion vector difference (8, 8) is 8; or, with the motion vector difference (4, 4) as an example, it becomes (100, 100) after binary coding, so the first coded bit overhead of the motion vector difference is 6. When the motion vector difference is other value, it is possible to deduce by analogy, and examples will not be given one by one herein.

With the pixel accuracy being 1/16 as an example, when bypass coding is employed to code the pixel accuracy, reference is made in conjunction with Table 1 in the foregoing embodiment, where the coded bit stream is 0, so the second coded bit overhead of the pixel accuracy 1/16 is 1. Alternatively, with the pixel accuracy being ½ as an example, when bypass coding is employed to code the pixel accuracy, reference is made in conjunction with Table 1 in the foregoing embodiment, where the coded bit stream is 1110, so the second coded bit overhead of the pixel accuracy 1/16 is 4. When the pixel accuracy is other value, it is possible to deduce by analogy, and examples will not be given one by one herein.

In operation S86, a sum of the first coded bit overhead and the second coded bit overhead corresponding to the target motion vector may be used as coded bit overhead corresponding to the target motion vector.

A sum of the first coded bit overhead and the second coded bit overhead corresponding to the target motion vector is calculated as coded bit overhead corresponding to the target motion vector. For example, if the first coded bit overhead corresponding to the target motion vector is 6 and the second coded bit overhead is 5, the coded bit overhead corresponding to the target motion vector is 11.

In operation S87, the target motion vector corresponding to the smallest coded bit overhead may be used as a predictive motion vector, and the current coding block is coded based on the predictive motion vector and the optimal motion vector.

Each candidate motion vector in the candidate list corresponding to the second preset number of pixel accuracies is used as a target motion vector, whereby it is possible to derive coded bit overhead corresponding to the plurality of target motion vectors. The target motion vector corresponding to the smallest coded bit overhead is selected therefrom as a predictive motion vector, and the current coding block is coded based on the predictive motion vector and the optimal motion vector. Specifically, the motion vector difference and pixel accuracy corresponding to the predictive motion vector, as well as the index value of the predictive motion vector in the candidate list, can be used to carry out syntax element expression of the final optimal motion vector, and the current coding block is coded based on the syntax element expression.

Distinct from the foregoing embodiment, a candidate list of the current coding block corresponding to the second preset number of pixel accuracies is respectively constructed in the preset prediction mode. Accordingly, based on the candidate list, the final optimal motion vector of the current coding block is obtained, and each of the candidate motion vectors in the candidate list corresponding to the second preset number of pixel accuracies is used as a target motion vector. Then, a motion vector difference between the target motion vector and the final optimal motion vector is obtained. Further, the first coded bit overhead of the motion vector difference corresponding to the target motion vector and the second coded bit overhead of the pixel accuracy corresponding to the target motion vector are counted. A sum of the first coded bit overhead and the second coded bit overhead corresponding to the target motion vector is taken as coded bit overhead corresponding to the target motion vector. Thus, the corresponding target motion vector of the smallest coded bit overhead is used as a predictive motion vector. Thereby, it is possible to reduce the quantity of data of the current coding block after being coded and to increase the compression rate, which is conductive to reducing the transmission load and storage space occupied after video coding.

Figure 9:
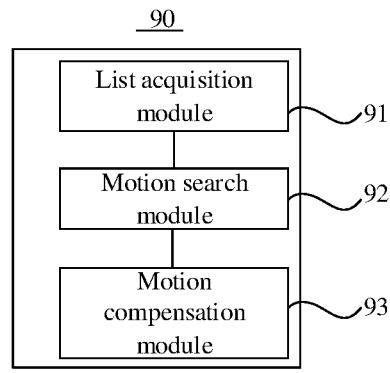
FIG. 9 is a schematic diagram of a framework of an embodiment of a motion vector prediction device of the present disclosure.

Reference is made to FIG. 9, which is a schematic diagram of a framework of an embodiment of a motion vector prediction device 90 of the present disclosure. The motion vector prediction device 90 includes a list acquisition module 91, a motion search module 92, and a motion compensation module 93. The list acquisition module 91 is configured to acquire a candidate list of a current coding block in a preset prediction mode, where the candidate list includes a plurality of candidate motion vectors. The motion search module 92 is configured to perform a motion search of the plurality of candidate motion vectors in the candidate list to obtain an initial optimal motion vector of the current coding block in the preset prediction mode. The motion compensation module 93 is configured to use each of a first preset number of pixel accuracies to perform motion compensation on the initial optimal motion vector to determine a final optimal motion vector of the current coding block. Therein, the preset prediction mode includes any one of a plurality of prediction modes, and pixel accuracies used in any one of the prediction modes are identical. In an implementation scenario, the first preset number is an integer and is not less than 3. In an implementation scenario, the pixel accuracies include: a 1/16 pixel accuracy, a 1/8 pixel accuracy, a 1/4 pixel accuracy, a 1/2 pixel accuracy, an integer pixel accuracy, a 2 times pixel accuracy, a 4 times pixel accuracy, a 8 times pixel accuracy, and a 16 times pixel accuracy. In an implementation scenario, in any one of the preset prediction modes, a same pixel accuracy corresponds to a same pixel accuracy identifier used to represent the pixel accuracy. In an implementation scenario, the plurality of prediction modes include: a conventional AMVP mode, an affine AMVP mode, an AMVP mode based on intra block copy, and a Hash AMVP mode.

In the above solution, a candidate list of a current coding block in a preset prediction mode is acquired, where the candidate list includes a plurality of candidate motion vectors. Then, a motion search of the plurality of candidate motion vectors in the candidate list is performed to obtain an initial optimal motion vector of the current coding block in the preset prediction mode. Further, a first preset number of pixel accuracies are each used to perform motion compensation on the initial optimal motion vector to determine a final optimal motion vector of the current coding block. The preset prediction mode includes any one of a plurality of prediction modes, and pixel accuracies used in any prediction mode are identical. Thereby, it is possible to make the pixel accuracies used in the plurality of prediction modes consistent and processing loops used in the plurality of prediction modes consistent to reduce the software and hardware implementation difficulty of motion vector prediction, which is conducive to improving the prediction accuracy.

In some embodiments, the motion compensation module 93 includes a first refinement treatment sub-module configured to perform refinement treatment on the initial optimal motion vector with each of the first preset number of pixel accuracies to obtain a plurality of first offset motion vectors deviating from the initial optimal motion vector. The motion compensation module 93 further includes a first target pixel accuracy selection sub-module configured to use each of the first preset number of pixel accuracies as a first target pixel accuracy. The motion compensation module 93 further includes a starting motion vector determination sub-module configured to select any of the initial optimal motion vector and the first offset motion vectors whose pixel accuracies are lower than the first target pixel accuracy, as a starting motion vector corresponding to the first target pixel accuracy. The motion compensation module 93 further includes a second refinement treatment sub-module configured to perform refinement treatment on the initial motion vector corresponding to the first target pixel accuracy, with the first target pixel accuracy, to obtain a plurality of second offset motion vectors deviating from the starting motion vector. The motion compensation module 93 further includes a final optimal motion vector determination sub-module configured to select, from a plurality of second offset motion vectors, a motion vector whose rate-distortion cost satisfies a preset screening condition, as a final optimal motion vector of the current coding block.

Distinct from the foregoing embodiment, a first preset number of pixel accuracies are each used to perform refinement treatment on the initial optimal motion vector, to obtain a plurality of first offset motion vectors deviating from the initial optimal motion vector. Further, each of the first preset number of pixel accuracies is used a first target pixel accuracy. Accordingly, any of the initial optimal motion vector and the first offset motion vectors whose pixel accuracies are lower than the first target pixel accuracy is selected as a starting motion vector corresponding to the first target pixel accuracy. Then, the first target pixel accuracy is used to perform refinement treatment on the starting motion vector corresponding thereto to obtain a plurality of second offset motion vectors deviating from the starting motion vector. Thus, a motion vector whose rate-distortion cost satisfies a preset screening condition is selected from the plurality of second offset motion vectors, as the final optimal motion vector of the current coding block, thereby making it possible to expand the motion vectors that may be thoroughly checked in the motion compensation process and to improve the prediction accuracy.

Figure 10:
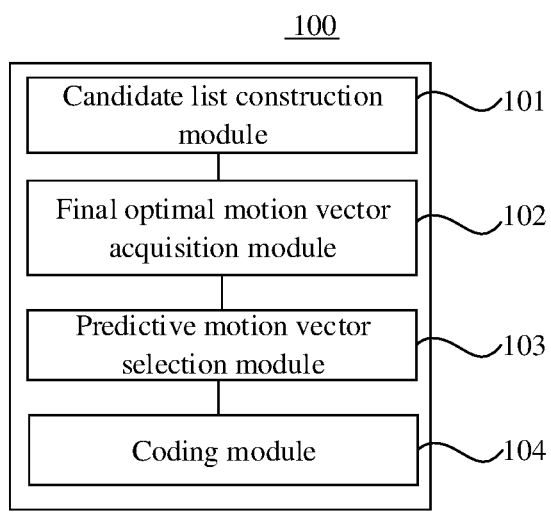
FIG. 10 is a schematic diagram of a framework of an embodiment of a video coding device of the present disclosure.

Reference is made to FIG. 10, which is a schematic diagram of a framework of an embodiment of a video coding device 100 of the present disclosure. The video coding device 100 includes a candidate list construction module 101, a final optimal motion vector acquisition module 102, a predictive motion vector selection module 103, and a coding module 104. The candidate list construction module 101 is configured to construct a candidate list of a current coding block in a preset prediction mode, where the candidate list contains a plurality of candidate motion vectors. The final optimal motion vector acquisition module 102 is configured to acquire a final optimal motion vector of the current coding block based on the candidate list, where the final optimal motion vector is acquired by use of a motion vector prediction device in any one of the motion vector prediction device embodiments. The predictive motion vector selection module 103 is configured to select one of the plurality of candidate motion vectors as a predictive motion vector. The coding module 104 is configured to code the current coding block based on the predictive motion vector and the final optimal motion vector.

In the above solution, a candidate list of a current coding block in a preset prediction mode is constructed, where the candidate list contains a plurality of candidate motion vectors. Thus, based on the candidate list, a final optimal motion vector of the current coding block is acquired, and the final optimal motion vector is obtained by using a motion vector prediction device in any of the motion vector prediction device embodiments. Further, one of the plurality of candidate motion vectors is selected as a predictive motion vector, and the current coding block is coded based on the predictive motion vector and the final optimal motion vector. Thereby, it is possible to reduce the software and hardware implementation difficulty of motion vector prediction, which is conductive to improving the prediction accuracy and optimizing the video coding quality.

In some embodiments, the candidate list construction module 101 is specifically configured to construct a candidate list of the current coding block corresponding to the second preset number of pixel accuracies in the preset prediction mode. The predictive motion vector selection module 103 includes a target motion vector selection sub-module configured to use each of the candidate motion vectors in the candidate list corresponding to the second preset number of pixel accuracies, as a target motion vector. The predictive motion vector selection module 103 further includes a motion vector difference acquisition sub-module configured to acquire a motion vector difference between the target motion vector and the final optimal motion vector. The predictive motion vector selection module 103 further includes a coded bit overhead counting sub-module configured to count first coded bit overhead of the motion vector difference corresponding to the target motion vector and second coded bit overhead of the pixel accuracy corresponding to the target motion vector. The predictive motion vector selection module 103 further includes a coded bit overhead calculation sub-module configured to use a sum of the first coded bit overhead and second coded bit overhead corresponding to the target motion vector as the coded bit overhead corresponding to the target motion vector. The predictive motion vector selection module 103 further includes a predictive motion vector determination sub-module configured to take the target motion vector corresponding to the smallest coded bit overhead as the predictive motion vector. In an implementation scenario, the first coded bit overhead of the motion vector difference is the number of bits of the motion vector difference after being coded, and the second coded bit overhead of the pixel accuracy is the number of bits of the pixel accuracy after being coded.

Distinct from the foregoing embodiment, in the preset prediction mode, a candidate list of the current coding block corresponding to the second preset number of pixel accuracies is constructed. Thus, based on the candidate list, the final optimal motion vector of the current coding block is acquired. Further, each of the candidate motion vectors in the candidate list corresponding to the second preset number of pixel accuracies is used as a target motion vector. Thus, a motion vector difference between the target motion vector and the final optimal motion vector is acquired. The first coded bit overhead of the motion vector difference corresponding to the target motion vector and the second coded bit overhead of the pixel accuracy corresponding to the target motion vector are counted. A sum of the first coded bit overhead and second coded bit overhead corresponding to the target motion vector is used as the coded bit overhead corresponding to the target motion vector. Accordingly, the target motion vector corresponding to the smallest coded bit overhead is used as the predictive motion vector. Thereby, it is possible to reduce the quantity of data of the current coding block after being coded and to increase the compression rate, which is conductive to reducing the transmission load and reducing storage space occupied after video coding.

In some embodiments, the motion vector difference acquisition sub-module includes a saturation treatment unit configured to saturate the final optimal motion vector with a 16*N times pixel accuracy and to saturate the target motion vector with the 16*N times pixel accuracy. Therein, N is a pixel accuracy corresponding to the target motion vector. The motion vector difference acquisition sub-module further includes a motion vector difference calculation unit configured to calculate a vector between the saturated final optimal motion vector and the saturated target motion vector, as the motion vector difference.

Distinct from the foregoing embodiment, the final optimal motion vector is saturated with a 16*N times pixel accuracy, and the target motion vector is saturated with the 16*N times pixel accuracy, where N is a pixel accuracy corresponding to the target motion vector. Thus, the vector difference between the saturated final optimal motion vector and the saturated target motion vector is calculated as the motion vector difference, so that the motion vector with a sub-pixel accuracy can still be expressed as an integer; and possible errors in the saturation process can be eliminated when N is not 1, thereby making it possible for convenient and accurate coding.

In some embodiments, the coding module 104 includes a syntax element expression sub-module configured to carry out syntax element expression of the final optimal motion vector by use of the motion vector difference and pixel accuracy corresponding to the predictive motion vector and the index value of the predictive motion vector in the candidate list. The coding module 104 further includes a coding sub-module configured to code the current coding block based on the syntax element expression.

In some embodiments, the second preset number of pixel accuracies include at least an integer pixel accuracy. The candidate list construction module 101 includes a first candidate list construction sub-module configured to construct a first candidate list of the current coding block corresponding to the integer pixel accuracy. Therein, the first candidate list contains a plurality of first candidate motion vectors. The candidate list construction module 101 further includes a second target pixel accuracy selection sub-module configured to use each of other pixel accuracies of the second preset number of pixel accuracies than the integer pixel accuracy as a second target pixel accuracy. The candidate list construction module 101 further includes a second candidate list construction sub-module configured to convert each of the pixel accuracies of the plurality of first candidate motion vectors in the first candidate list into to the second target pixel accuracy, thereby obtaining a second candidate list corresponding to the second target pixel accuracy. The candidate list construction module 101 further includes a candidate list combination sub-module configured to use a combination of the first candidate list and the second candidate list as a candidate list corresponding to the second preset number of pixel accuracies.

Figure 11:
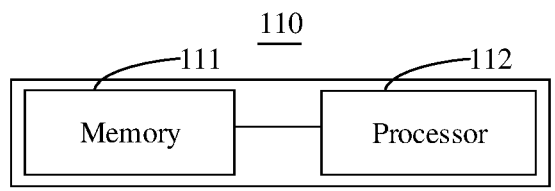
FIG. 11 is a schematic diagram of a framework of an embodiment of a motion vector prediction apparatus of the present disclosure.

Reference is made to FIG. 11, which is a schematic diagram of a framework of an embodiment of a motion vector prediction apparatus 110 of the present disclosure. The motion vector prediction apparatus 110 includes a memory 111 and a processor 112 coupled to each other. The memory 111 is configured to store program instructions, and the processor 112 is configured to execute the program instructions to implement the steps in any of the foregoing motion vector prediction method embodiments.

Specifically, the processor 112 is configured to control itself and the memory 111 to implement the steps in any of the foregoing motion vector prediction method embodiments. The processor 112 may also be referred to as a CPU (Central Processing Unit). The processor 112 may be an integrated circuit chip with signal processing capabilities. The processor 112 may also be a general-purpose processor, a digital signal processor (DSP), an application specific integrated circuit (ASIC), a field-programmable gate array (FPGA), or other programmable logic device, discrete gate or transistor logic device, discrete hardware component. The general-purpose processor may be a microprocessor, or the processor may also be any conventional processor, or the like. In addition, the processor 112 may be implemented by multiple integrated circuit chips.

In the above solution, a candidate list of a current coding block in a preset prediction mode is acquired, where the candidate list includes a plurality of candidate motion vectors. Then, a motion search of the plurality of candidate motion vectors in the candidate list is performed to obtain an initial optimal motion vector of the current coding block in the preset prediction mode. The first preset number of pixel accuracies are each used to perform motion compensation on the initial optimal motion vector to determine a final optimal motion vector of the current coding block. Further, the preset prediction mode includes any one of the plurality of prediction modes, and pixel accuracies used in any one of the prediction modes are identical. Thereby, it is possible to make the pixel accuracies used in the plurality of prediction modes consistent and processing loops used in the plurality of prediction modes consistent to reduce the software and hardware implementation difficulty of motion vector prediction, which is conducive to improving the prediction accuracy.

Figure 12:
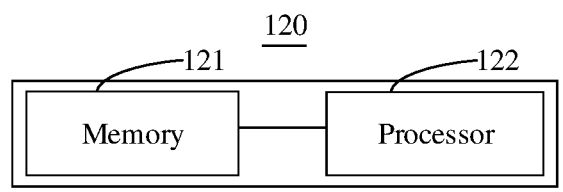
FIG. 12 is a schematic diagram of a framework of an embodiment of a video coding apparatus of the present disclosure.

Reference is made to FIG. 12, which is a schematic diagram of a framework of an embodiment of a video coding apparatus 120 of the present disclosure. The video coding apparatus 120 includes a memory 121 and a processor 122 coupled to each other. The memory 121 is configured to store program instructions, and the processor 122 is configured to execute the program instructions to implement the steps in any of the foregoing video coding method embodiments.

Specifically, the processor 122 is configured to control itself and the memory 121 to implement the steps in any of the foregoing video coding method embodiments. The processor 112 may also be referred to as a Central Processing Unit (CPU). The processor 112 may be an integrated circuit chip with signal processing capabilities. The processor 112 may also be a general-purpose processor, a digital signal processor (DSP), an application specific integrated circuit (ASIC), a field-programmable gate array (FPGA), or other programmable logic device, discrete gate or transistor logic device, discrete hardware component. The general-purpose processor may be a microprocessor, or the processor may also be any conventional processor, or the like. In addition, the processor 122 may be implemented by multiple integrated circuit chips.

In the above solution, a candidate list of a current coding block in a preset prediction mode is constructed, where the candidate list includes a plurality of candidate motion vectors. Thus, a final optimal motion vector of the current coding block is acquired based on the candidate list. Further, final optimal motion vector is obtained by using the steps in any of the foregoing motion vector prediction method embodiments. One of the plurality of candidate motion vectors is selected as a predictive motion vector. The current coding block is coded based on the predictive motion vector and the final optimal motion vector. Thereby, it is possible to reduce the software and hardware implementation difficulty of motion vector prediction, which is conducive to improving the prediction accuracy and optimizing the video coding quality.

Figure 13:
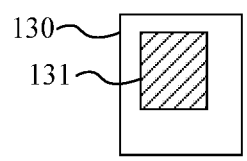
FIG. 13 is a schematic diagram of a framework of an embodiment of a storage device of the present disclosure.

Reference is made to FIG. 13, which is a schematic diagram of a framework of an embodiment of a storage device 130 of the present disclosure. The storage device 130 stores program instructions 131 which can be executed by a processor to implement the steps in any of the foregoing motion vector prediction method embodiments or to implement the steps in any of the foregoing video coding method embodiments.

The above solution can reduce the software and hardware implementation difficulty of motion vector prediction, thereby being conducive to improving the prediction accuracy and optimizing the video coding quality.

In the several embodiments provided in the present disclosure, it should be understood that the disclosed system, device, and method may be implemented in other ways. For example, the device embodiments described above are only illustrative. For example, the division of units is only a logical function division, and other divisions are allowed in actual implementation. For example, multiple units or components can be combined or integrated into another system, or some features can be ignored, or not implemented. In addition, the mutual coupling or direct coupling or communication connection as displayed or discussed may be indirect coupling or communication connection via some interfaces, devices or units, and may be in electrical, mechanical or other forms.

Apart from that, the respective functional units in various embodiments of the present disclosure may be integrated into one processing unit, or each unit may exist alone physically, or two or more units may be integrated into one unit. The above-mentioned integrated unit can be implemented in the form of hardware or software functional unit. The foregoing are only embodiments of the present disclosure, and do not thus limit the scope of the present disclosure. Any equivalent structure or equivalent process transformation made using the content of the description and drawings of the present disclosure, or applied directly or indirectly to other related technical fields likewise shall be included within the scope of patent protection of the present disclosure.

The invention claimed is:

1. A motion vector prediction method, comprising:
  acquiring a candidate list of a current coding block in a preset prediction mode, wherein the candidate list comprises a plurality of candidate motion vectors;
  performing a motion search of the plurality of candidate motion vectors in the candidate list to obtain an initial optimal motion vector of the current coding block in the preset prediction mode;

performing motion compensation on the initial optimal motion vector by using each of a first preset number of pixel accuracies, to determine a final optimal motion vector of the current coding block, wherein the first preset number of pixel accuracies is equal to or greater than 3;

wherein the preset prediction mode comprises any one of a plurality of prediction modes, and pixel accuracies used in any one of the prediction modes are identical;

wherein said performing motion compensation on the initial optimal motion vector by using each of a first preset number of pixel accuracies, to determine a final optimal motion vector of the current coding block comprises:

performing refinement treatment on the initial optimal motion vector by using each of the first preset number of pixel accuracies to obtain a plurality of first offset motion vectors deviating from the initial optimal motion vector;

using each of the first preset number of pixel accuracies as a first target pixel accuracy;

selecting any one of the initial optimal motion vector and the first offset motion vectors whose pixel accuracies are lower than the first target pixel accuracy, as a starting motion vector corresponding to the first target pixel accuracy;

performing refinement treatment on the starting motion vector corresponding to the first target pixel accuracy by using the first target pixel accuracy to obtain a plurality of second offset motion vectors deviating from the starting motion vector;

selecting, from the plurality of second offset motion vectors, a motion vector whose rate-distortion cost satisfies a preset screening condition, as the final optimal motion vector of the current coding block.

2. The method according to claim 1, wherein the first preset number is an integer and not less than 3;

and/or, the pixel accuracies comprise: a 1/16 pixel accuracy, a 1/8 pixel accuracy, a 1/4 pixel accuracy, a 1/2 pixel accuracy, an integer pixel accuracy, a 2 times pixel accuracy, a 4 times pixel accuracy, a 8 times pixel accuracy, and a 16 times pixel accuracy;

and/or, in any one of the preset prediction modes, a same one of the pixel accuracies corresponds to a same pixel accuracy identifier used to represent the pixel accuracy;

wherein the plurality of preset prediction modes comprise: a conventional AMVP mode, an affine AMVP mode, an AMVP mode based on intra block copy, and a Hash AMVP mode.

3. The method according to claim 2, wherein the performing a motion search of the plurality of candidate motion vectors in the candidate list to obtain an initial optimal motion vector of the current coding block in the preset prediction mode comprises:

in response to the conventional AMVP mode, performing motion compensation on the candidate motion vectors in the candidate list and calculating Rate Distortion costs (RDCOSTs) based on Sum of Absolute Difference (SAD) thereof;

selecting the candidate motion vector with the smallest RDCOST as a starting motion vector of a TZ search;

performing a TZ search with the starting motion vector to acquire the initial optimal motion vector.

4. The method according to claim 3, wherein the performing motion compensation on the initial optimal motion vector by using each of a first preset number of pixel accuracies, to determine a final optimal motion vector of the current coding block comprises:

taking the initial optimal motion vector as a starting motion vector, and using each of the first preset number of pixel accuracies to offset the starting motion vector;

selecting the motion vector with the smallest RDCOST from the plurality of offset motion vectors, as a final optimal motion vector.

5. The method according to claim 2, wherein the performing a motion search of the plurality of candidate motion vectors in the candidate list to obtain an initial optimal motion vector of the current coding block in the preset prediction mode comprises:

in response to the affine AMVP mode, according to a position relationship between the center point and the CP point of each 4*4 sub-block, using a Control Point's MV (CPMV) affine method to obtain the MVs of each sub-block;

after each sub-block acquires the MVs, acquiring a prediction of each sub-block through a motion compensation difference filter, and combining the predictions of all the sub-blocks to derive a pixel value of the entire match block;

making differences between the pixel values of the match blocks and the original pixel value of the current coding block to obtain Rate Distortion costs (RDCOSTs) based on Sum of Absolute Transformed Difference (SATD);

selecting the CPMV with the smallest RDCOST as Control Point's Motion Vector Prediction (CPMVP), using the CPMVP to iteratively update CPMV based on optical flow and thereby acquire the initial optimal motion vector.

6. The method according to claim 5, wherein the performing motion compensation on the initial optimal motion vector by using each of a first preset number of pixel accuracies, to determine a final optimal motion vector of the current coding block comprises:

subjecting the CPMV subjected to preset offset vectors, and selecting the motion vector with the smallest RDCOST as the final optimal motion vector.

7. The method according to claim 2, further comprising: in response to the AMVP mode based on intra block copy, using a method of Hash matching to acquire the initial optimal motion vector.

8. The method according to claim 7, further comprising: if the Hash matching fails to find the initial optimal motion vector, using the method of motion search to acquire the initial optimal motion vector.

9. The prediction according to claim 2, further comprising:

in response to the Hash AMVP mode, using a method of Hash matching to acquire the initial optimal motion vector.

10. The method according to claim 2, further comprising:

acquiring a candidate list of the current coding block in each of at least two modes of the conventional AMVP mode, the affine AMVP mode, the AMVP mode based on intra block copy, and the Hash AMVP mode;

acquiring the final optimal motion vectors and the corresponding Rate Distortion costs (RDCOSTs) in the at least two modes;

selecting the final optimal motion vector with the smallest RDCOST as the final optimal motion vector of the current coding block.

11. A storage device, having stored thereon program instructions, which can be executed by a processor to implement a motion vector prediction method comprising:

acquiring a candidate list of a current coding block in a preset prediction mode, wherein the candidate list comprises a plurality of candidate motion vectors; performing a motion search of the plurality of candidate motion vectors in the candidate list to obtain an initial optimal motion vector of the current coding block in the preset prediction mode; performing motion compensation on the initial optimal motion vector by using each of a first preset number of pixel accuracies, to determine a final optimal motion vector of the current coding block, wherein the first preset number of pixel accuracies is equal to or greater than 3; wherein the preset prediction mode comprises any one of a plurality of prediction modes, and pixel accuracies used in any one of the prediction modes are identical; or to implement a video coding method comprising: constructing a candidate list of a current coding block in a preset prediction mode, wherein the candidate list contains a plurality of candidate motion vectors; acquiring a final optimal motion vector of the current coding block based on the candidate list, wherein the final optimal motion vector is obtained by using a prediction method comprising: acquiring a candidate list of a current coding block in a preset prediction mode, wherein the candidate list comprises a plurality of candidate motion vectors; performing a motion search of the plurality of candidate motion vectors in the candidate list to obtain an initial optimal motion vector of the current coding block in the preset prediction mode; performing motion compensation on the initial optimal motion vector by using each of a first preset number of pixel accuracies, to determine a final optimal motion vector of the current coding block; wherein the preset prediction mode comprises any one of a plurality of prediction modes, and pixel accuracies used in any one of the prediction modes are identical; selecting one of the plurality of candidate motion vectors as a predictive motion vector, and coding the current coding block based on the predictive motion vector and the final optimal motion vector; wherein said performing motion compensation on the initial optimal motion vector by using each of a first preset number of pixel accuracies, to determine a final optimal motion vector of the current coding block comprises: performing refinement treatment on the initial optimal motion vector by using each of the first preset number of pixel accuracies to obtain a plurality of first offset motion vectors deviating from the initial optimal motion vector; using each of the first preset number of pixel accuracies as a first target pixel accuracy; selecting any one of the initial optimal motion vector and the first offset motion vectors whose pixel accuracies are lower than the first target pixel accuracy, as a starting motion vector corresponding to the first target pixel accuracy; performing refinement treatment on the starting motion vector corresponding to the first target pixel accuracy by using the first target pixel accuracy to obtain a plurality of second offset motion vectors deviating from the starting motion vector; selecting, from the plurality of second offset motion vectors, a motion vector whose rate-distortion cost satisfies a preset screening condition, as the final optimal motion vector of the current coding block.

\* \* \* \* \*